(12) United States Patent
Boschert et al.

(10) Patent No.: US 12,000,451 B2
(45) Date of Patent: Jun. 4, 2024

(54) DEVICE AND METHOD FOR COMPENSATING FOR A VIBRATION AND/OR A MATERIAL STRESS

(71) Applicant: Siemens Energy Global GmbH & Co. KG, Munich (DE)

(72) Inventors: Stefan Boschert, Neubiberg (DE); Thomas Hammer, Schwabach (DE); Christoph Heinrich, Donauwoerth (DE); Vincent Malik, Munich (DE); Jochen Meth, Emskirchen (DE)

(73) Assignee: Siemens Energy Global GmbH & Co. KG, Erlangen (DE)

( * ) Notice: Subject to any disclaimer, the term of this patent is extended or adjusted under 35 U.S.C. 154(b) by 758 days.

(21) Appl. No.: 17/053,454

(22) PCT Filed: May 8, 2018

(86) PCT No.: PCT/EP2018/061889
§ 371 (c)(1),
(2) Date: Nov. 6, 2020

(87) PCT Pub. No.: WO2019/214809
PCT Pub. Date: Nov. 14, 2019

(65) Prior Publication Data
US 2021/0246963 A1    Aug. 12, 2021

(51) Int. Cl.
*F16F 15/02*        (2006.01)
*H01F 27/06*        (2006.01)
(Continued)

(52) U.S. Cl.
CPC ............ *F16F 15/022* (2013.01); *F16F 9/00* (2013.01); *F16F 13/007* (2013.01);
(Continued)

(58) Field of Classification Search
CPC .. F16F 15/02; F16F 15/022; F16F 2224/0241; F16F 9/00; F16F 13/00; F16F 13/0007; B60N 2/522
See application file for complete search history.

(56) References Cited

U.S. PATENT DOCUMENTS 6,009,985 A * 1/2000 Ivers ............... F16F 7/104
244/54
2012/0097827 A1* 4/2012 Klink ............... B60G 21/0551
248/634

FOREIGN PATENT DOCUMENTS

BR    112012030676-6    * 12/2019
CN    210805492 U        * 6/2020
(Continued)

*Primary Examiner* — Tan Le
(74) *Attorney, Agent, or Firm* — Laurence A. Greenberg; Werner H. Stemer; Ralph E. Locher

(57) ABSTRACT

A device for compensating for vibration and/or material stress of a component of a high-voltage system filled with a viscous medium includes a piston and a housing. A first end piece of the piston may be coupled to the component of the system. A second end piece of the piston may be at least partly within the housing and enclosed thereby, enabling movement of the piston and the housing in opposite directions along an axis. The second end piece may be coupled to an inner wall of the housing by at least one spring. The piston and the housing are surrounded by the medium filling the system. A method and computer program product for computer-aided design of a device for compensating for vibration and/or material stress of a component of the system filled with a viscous medium are also provided.

13 Claims, 2 Drawing Sheets

(51) Int. Cl.
*H01F 38/36* (2006.01)
*F16F 9/00* (2006.01)
*F16F 13/00* (2006.01)

(52) U.S. Cl.
CPC ...... *F16F 2224/0241* (2013.01); *H01F 27/06* (2013.01); *H01F 38/36* (2013.01)

(56) References Cited

FOREIGN PATENT DOCUMENTS

| | | | | |
|---|---:|---|---|---|
| CN | 212782961 | U | * | 3/2021 |
| CN | 114724810 | A | * | 7/2022 |
| CN | 216921581 | U | * | 7/2022 |
| EP | 1359342 | A1 | | 11/2003 |
| GB | 2310025 | A | * | 8/1997 ............... F16F 1/38 |
| WO | 2008034271 | A2 | | 3/2008 |
| WO | WO2009034950 | A1 | | 3/2009 |

* cited by examiner

DEVICE AND METHOD FOR COMPENSATING FOR A VIBRATION AND/OR A MATERIAL STRESS

BACKGROUND OF THE INVENTION

Field of the Invention

The invention relates to a device and a method for compensating for a vibration and/or a material stress of a component of a high-voltage system filled with a viscous medium.

Components of high-voltage systems, such as for example transformers, are typically produced from highly insulating and preferably corrosion-resistant materials. During transport, during assembly or during operation, vibrations and/or internal stresses of the system and/or of the individual components of the system may occur. In order to compensate for such loads, the components of the systems can generally be fastened in the system by means of a construction of electrically insulating material, such as for example wood or cellulose, and for example be cushioned by means of elements, for example blocks of elastic plastic or rubber, as shock absorbers. For additional vibrational loads, for example during operation, however, additional damping components may be necessary. To be mentioned as an example is a transformer on a drilling platform, which may be exposed to strong additional loads as a result of vibrations of the platform and/or thermal expansion of the material.

SUMMARY OF THE INVENTION

An object of the invention is to provide a device and a method which make it possible to compensate more efficiently and more resiliently for vibrations and/or material stresses and/or shock loads during transport for components of a high-voltage system.

The object is achieved by a device comprising a piston and a housing for compensating for a vibration and/or a material stress of a component of a high-voltage system filled with a viscous medium, wherein a first end piece of the piston is coupled to the component, a second end piece of the piston is disposed at least partly within the housing and is enclosed by it, the piston and the housing are movable in opposite directions along an axis, the second end piece of the piston is coupled to an inner wall of the housing by a spring, and the piston and the housing are disposed in the high-voltage system and surrounded by the medium with which the high-voltage system is filled. The object tis also achieved by a method for the computer-aided structural design of the device wherein a simulation model of the device is provided, the viscosity of the viscous medium with which the high-voltage system is filled is read in as a first input parameter for the simulation, properties of the high-voltage system and/or the component of the high-voltage system are read in as boundary conditions of the simulation, a computer-aided simulation of the flow mechanics of the viscous medium is carried out, and a simulation result for the structural design of the device is output. The object is additionally achieved by a non-transitory computer program product which can be loaded directly into a programmable computer, comprising program code parts that are suitable for carrying out the steps of the method. Advantageous embodiments and developments of the invention are provided in the dependent claims.

A first aspect of the invention concerns a device comprising a piston and a housing for compensating for a vibration and/or a material stress of a component of a high-voltage system filled with a viscous medium, wherein a) a first end piece of the piston is coupled to the component,
b) a second end piece of the piston is arranged at least partly within the housing and is enclosed by it,
c) the piston and the housing are movable in opposite directions along an axis,
d) the second end piece of the piston is coupled to an inner wall of the housing by means of a spring, and
e) the piston and the housing are arranged in the high-voltage system and surrounded by the medium with which the high-voltage system is filled.

One advantage of the device according to the invention is that a component of a high-voltage system filled with a viscous medium, for example a transformer, is damped by means of at least one spring and by a medium flowing in and out. In particular, the component may be arranged in the high-voltage system. According to the invention, a viscous medium which is preferably already present in the high-voltage system can be used for hydraulic damping. For example, a transformer tank may already be filled with oil, so that according to the invention in particular no additional medium is used. In the event of loads, for example due to vibrations, on the component, the piston may be forced into the housing and the spring may be elastically deformed, so that an internal volume in the housing is reduced, and the medium can flow out of the housing. The at least one spring may couple the second end piece of the, for example cylindrical, piston to an inner wall of the housing in the direction of movement. When there is a movement of the piston and the housing in opposite directions, the medium can flow into the housing or out of it, i.e. the volume in the housing can be changed. The combination of the fluid dynamics of the medium and the damping properties of the spring can have the effect that a component in a high-voltage system can be mounted securely, since for example shocks can be absorbed. In particular, by means of the device it is possible to compensate for internal stress, for example as a result of thermal material deformations. The device may be implemented in the high-voltage system and on a component of the high-voltage system in such a way that vibrations of the component that occur are attenuated. The device may preferably be produced from electrically insulating material. The device may for example also attenuate a vibration of two components with respect to one another if the piston is coupled to the one component and the housing is coupled to the other.

"Coupled" may be understood within the context of the invention as meaning for example welded to one another, riveted, fastened, securely connected, adhesively bonded, fitted together, screwed or nailed.

In an advantageous embodiment of the device, an outer wall of the housing may be coupled to a supporting structure of the high-voltage system.

Preferably, the device may be coupled, such as for example securely connected, to a supporting structure, for example a framework or a mounting that supports a component, or an inner wall, of the high-voltage system. This allows natural vibrations of a component to be efficiently damped.

In a further, advantageous embodiment, the piston and/or the housing may be configured dependent on a property of the component of the high-voltage system and/or a property of the high-voltage system and/or on the surroundings of the high-voltage system and/or on conditions of transport or mounting of the high-voltage system.

A configuration, such as for example a shape and/or a material and/or a size, of the piston and/or of the housing may be formed in particular in such a way that it is possible for example to compensate for high vibration or shock loads on the component during the operation of the high-voltage system. Furthermore, a design of a piston and/or housing may for example be adapted to properties of a component to be damped or a property of the high-voltage system, for example expected loads as a result of external influences. In particular, a property may take the form of a data record.

In a further, advantageous embodiment, the viscous medium may be formed as an insulating liquid.

Components of a high-voltage system may for example be surrounded by an insulating liquid. Preferably, an already present electrically insulating liquid of the high-voltage system, for example oil, may be used for the damping of a vibration and/or the compensation for a material stress of a component of a high-voltage system by means of the device.

In a further, advantageous embodiment of the device, the second end piece of the piston may have a gap with a specified minimum gap distance in relation to at least one inner wall of the housing.

Compensation for vibrations and/or loads due to material stress can be achieved in particular by damping as a result of a displacement of the liquid caused by movement of the piston. Preferably, the second end piece of the piston is formed in such a way that it is enclosed by the housing, for example surrounded or contained or framed, and at the same time there is a distance between the outer wall of the piston and at least one inner wall of the housing. This can allow a flow of the medium when there is an oppositely directed movement of the piston and the housing. Preferably, a specified, immersion-dependent damping behavior can be achieved by an adapted minimum distance.

In a further, advantageous embodiment of the device, the minimum gap distance may be formed dependent on specified production tolerances of the component of the high-voltage system and/or of the high-voltage system.

Dependent on a specified minimum distance, a desired damping can be achieved. For components with specified production tolerances, i.e. for example uncertainties in the size of a component, the minimum distance may be chosen so as it is possible for example to compensate for a thermal expansion.

In a further, advantageous embodiment of the device, at least one wall of the housing may have at least one passage for a flow of the medium into the housing or out of the housing.

The piston can be slowed down by changing the flow cross section of the medium. In order to change the flow dynamics of the medium preferably in such a way that the damping properties of the device are improved, holes or gaps for example may be made in a housing wall.

In a further, advantageous embodiment of the device, the second end piece of the piston may have at least one clearance.

Preferably, the second end piece of the piston, which is enclosed at least partly by the housing, may comprise on at least one outer side clearances which change the fluid dynamics of the medium when there is opposing movement of the piston and the housing. In particular, the clearances may be arranged for a flow of the medium in the axial direction into the housing or out of the housing. For example, a clearance may be a depression, a groove, a hollow, a cavity, a bore or a space. The piston may for example also be formed as hollow or partly hollow on the inside.

In a further, advantageous embodiment of the device, at least one inner wall of the housing may have at least one clearance.

Preferably, the housing may comprise on an inner side clearances which change a flow of the medium into the housing or out of it when there is opposing movement of the piston and the housing in such a way that optimum or specified compensation for a vibration and/or material stress can be achieved.

In a further, advantageous embodiment of the device, a number and/or configuration and/or position of a clearance or a passage may be chosen dependent on a specified property of the high-voltage system and/or on the surroundings of the high-voltage system and/or on conditions of transport or mounting of the high-voltage system.

Preferably, a clearance or a passage may be formed in such a way that optimum or improved compensation for a vibration and/or a material stress can be achieved. For example, an immersion-dependent damping behavior can be achieved by a variation of the number and/or configuration and/or position of a clearance or a passage.

In a further, advantageous embodiment of the device, a spring constant of the at least one spring may be formed in such a way as to compensate for a vibration and/or a material stress of the component dependent on a property of the component of the high-voltage system and/or a property of the high-voltage system and/or on the surroundings of the high-voltage system and/or on conditions of transport or mounting of the high-voltage system.

For example, a property may be a physical variable. For example, an optimum spring constant may be determined dependent on the weight of a component and/or an ambient temperature of the high-voltage system and a specified degree of damping and be implemented.

In a further, advantageous embodiment of the device, the at least one spring may be formed as a helical spring, cup spring, buffer spring and/or annular spring.

Dependent on the shape and the weight of a component of the high-voltage system, a design of a spring may be used for the damping of the component.

In a further, advantageous embodiment of the device, the at least one spring may be produced at least partly from glass-fiber reinforced plastic.

In particular for high-voltage component, electrically insulating and corrosion-resistant materials are advantageously used. Preferably, springs of glass-fiber reinforced plastic may be used in the device.

A further aspect of the invention concerns a method for the computer-aided structural design of a device according to the invention, wherein
  a) a simulation model of the device is provided,
  b) the viscosity of the viscous medium with which the high-voltage system is filled is read in as a first input parameter for the simulation,
  c) properties of the high-voltage system and/or the component of the high-voltage system are read in as boundary conditions of the simulation,
  d) a computer-aided simulation of the flow mechanics of the viscous medium is carried out and
  e) a simulation result for the structural design of the device is output.

The invention comprises furthermore a computer program product which can be loaded directly into a programmable computer, comprising program code parts that are suitable for carrying out the steps of the simulation method.

For example, a configuration, such as for example shape, and/or a position of the device, may be determined by means of a simulation of the flow dynamics of the medium in the device and in its surroundings in the high-voltage system.

Exemplary embodiments of the device according to the invention are explained in more detail on the basis of the following description and are represented by way of example in the drawings:

DETAILED DESCRIPTION OF THE INVENTION

Objects corresponding to one another are provided with the same designations in all of the figures.

Figure 1A:
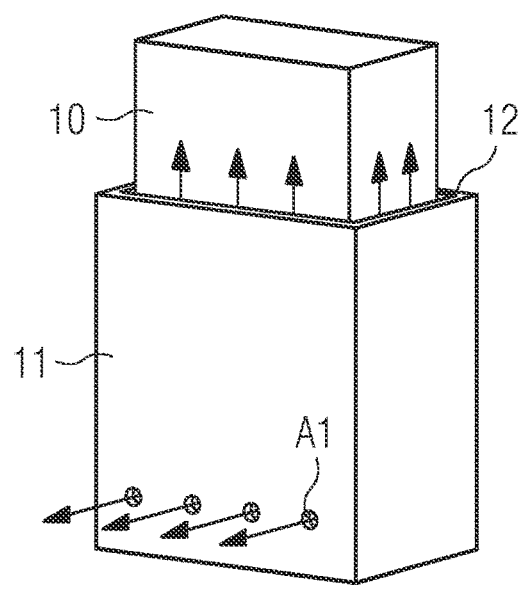
FIGS. 1A and 1B show a schematic representation of a device according to the invention.
Figure 1B:
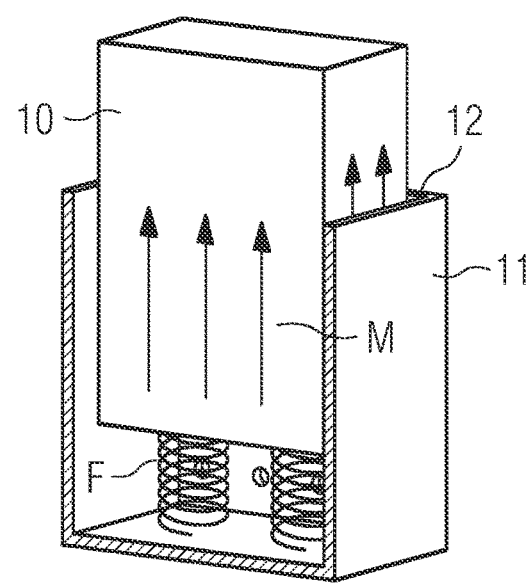

FIG. 1A shows the outer view and FIG. 1B shows a cross section and inner view of a first embodiment of the device according to the invention, comprising a housing 11 and a piston 10, in each case in a schematic representation. The housing 11 encloses in particular an end piece of the piston 10, i.e. frames, contains or encases the piston 10. The device should be understood as part of a high-voltage system, the piston 10 being connected in particular to a component to be damped of the high-voltage system and the housing 11 being connected, such as for example securely welded, to a supporting structure of the high-voltage system. The high-voltage system is filled with a viscous medium M, which in particular surrounds the piston 10 and the housing 11. The piston 10 and the housing 11 can be moved in particular in opposite directions, at least one end piece of the piston 10 being located in the housing 11. The housing 11 is formed in particular as hollow and in such a way that it can surround the second end piece of the piston 10. The diameter perpendicular to the axial direction of the piston 10 is at most equal to the inside diameter of the housing. In particular, this diameter is smaller, so that there is a gap 12 with a minimum gap distance between the piston 10 and at least one inner wall of the housing 11. The housing 11 and/or the piston 10 may in particular have a rectangular, polygonal, round or oval cross section.

The device according to the invention may for example be arranged in a transformer, the device serving for reducing vibration and/or stress loads, for example during transport, on a component of the transformer. The individual components of a high-voltage system, such as for example a transformer, are surrounded by an insulating medium M, in particular an electrically insulating liquid. According to the invention, the medium M located in the high-voltage system is used in the device for damping vibrations and/or compensating for material stresses.

A configuration, in particular a shape and/or a material and/or a size, of the piston 10 and/or of the housing 11 may be chosen dependent on a specified property of the high-voltage system, which may for example take the form of a data record, and/or on the surroundings of the high-voltage system and/or on conditions of transport or mounting of the high-voltage system. For example, the configuration of the device may be determined by means of a simulation of the fluid dynamics of the medium M in the device. A specified property may be for example a system type. Surroundings of the high-voltage system may for example have high temperature fluctuations, so that the configuration of the device can be chosen correspondingly to compensate for a thermal expansion of a component. Transport may for example take place over uneven ground. Mounting may for example be on a drilling platform.

The piston 10 and the housing 11 may be moved in opposite directions, for example in the direction of the longitudinal axis thereof. The first end piece of the piston 10 may be coupled to a component of the high-voltage system. The second end piece of the piston 10 may be surrounded by the housing 11 and coupled to it by way of at least one spring F.

A spring F may for example be formed as a helical spring, cup spring, buffer spring and/or annular spring. In particular, a spring may be produced from insulating, glass-fiber reinforced plastic.

Between the second end piece of the piston 10 and at least one inner wall of the housing 11, a gap 12 may be set with a minimum gap distance, so that the medium M, for example oil, can flow into the housing 11 and/or out of the housing 11. A minimum gap distance may be chosen so as it is possible for example with the device to compensate for a thermal expansion of a component. In particular, a minimum gap distance may be dependent on specified production tolerances of the component.

For example, for changing the fluid dynamics, the housing 11 may comprise at least one passage A1, such as for example a drilled hole, through which the medium M can flow out of the housing 11 and into the housing 11. A number and/or a configuration and/or a position of the passage A1 may be set in particular dependent on a specified property of the high-voltage system and/or on the surroundings of the high-voltage system and/or on conditions of transport or mounting of the high-voltage system. In particular, the number and/or configuration and/or position may be chosen such that a flow of the medium into the housing 11 and out of it when there is movement of the piston 10 achieves a high damping effect.

Figure 2A:
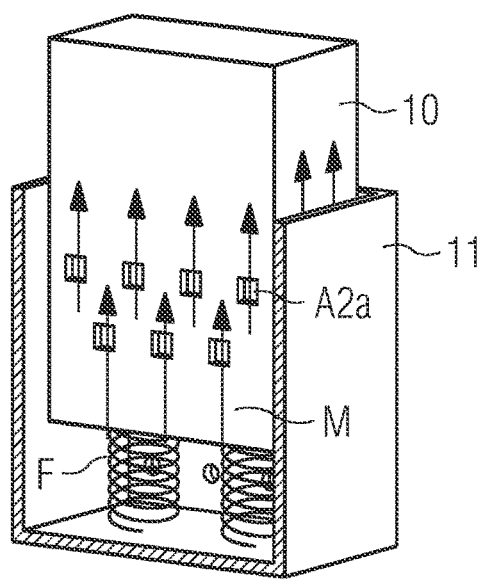
FIGS. 2A and 2B show further schematic representations of two exemplary embodiments of a device according to the invention.
Figure 2B:
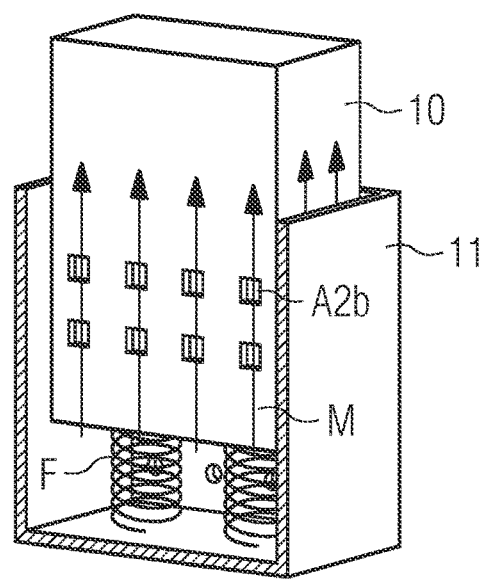

FIGS. 2A and 2B show a first and a second exemplary embodiment of a device according to the invention, the piston 10 having clearances A2a, A2b. As shown in FIG. 2A, the clearances A2a may be arranged along an outer side of the piston 10 and be arranged offset with respect to one another. FIG. 2B shows clearances A2b on an outer side of the piston 10, which are arranged lying above one another along the longitudinal axis of the piston 10. Clearances may also be configured in such a way that the piston is formed as partly or entirely hollow (not shown).

The arrangement of individual clearances A2a, A2b influences the flow dynamics in the housing. Preferably, the arrangement and configuration may be chosen in such a way that a flow when there is opposing movement of the piston 10 and the housing 11 makes optimum damping possible. The number and/or configuration and/or position of a clearance A2a, A2b may for example be chosen dependent on the surroundings of the high-voltage system, such as for example the situation or the ambient temperature. Furthermore, a design of the clearances A2a, A2b may be chosen dependent on a specified property of the high-voltage system and/or on conditions of transport or mounting of the high-voltage system.

A spring constant of the at least one spring F, which couples the piston 10 to the housing 11 in the direction of movement, may be chosen dependent on a property of the component of the high-voltage system, such as for example the weight, and/or a property of the high-voltage system and/or on the surroundings of the high-voltage system and/or on conditions of transport or mounting of the high-voltage system in such a way that optimum damping can be achieved.

The flow dynamics and the spring constant can determine the degree of vibration damping and/or the compensation for the material stress. In other words, the combination of an insulating liquid of the high-voltage system and at least one spring of insulating and corrosion-resistant material, such as for example glass-fiber reinforced plastic, can make it possible to compensate for a vibration and/or material stress of a component in a high-voltage system. Preferably, a computer-aided simulation can be carried out for optimum configuration and arrangement of the device in the high-voltage system.

Figure 3:
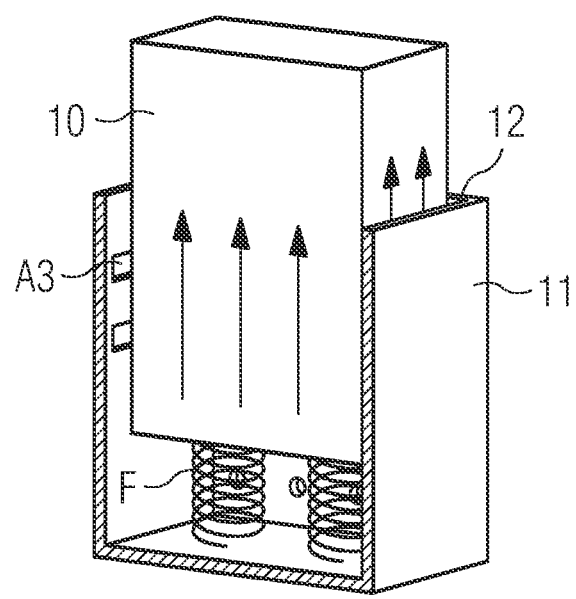
FIG. 3 shows a further schematic representation of a device according to the invention.

FIG. 3 shows a further exemplary embodiment of a device according to the invention, at least one inner wall of the housing having at least one clearance A3. When there is an opposing movement of the housing 11 and the piston 10, the medium M, such as for example an insulating liquid, can flow through the gap 12 with the minimum gap distance, the clearance A3 preferably influencing the flow in such a way that the coupling of the device to a component of the high-voltage system has a damping effect.

The device may in particular be coupled to the high-voltage system on at least one outer wall of the housing 11. For example, the underside of the housing 11 may be connected to a supporting structure of the high-voltage system. When there are loads as a result of vibrations, the device can consequently make damping of a vibration of the component with respect to the vibration of the high-voltage system possible.

The configuration, in particular the configuration of a passage A1 and/or a clearance A2$a$, A2$b$, A3, and/or position of the device in the high-voltage system can be determined on the basis of a computer-aided simulation of the flow mechanics of the medium in the high-voltage system. For this purpose, a simulation model of the device may be provided. For example, the simulation model comprises at least part of the high-voltage system. In particular, boundary conditions of the high-voltage system, such as for example properties of the component to be damped or ambient data, are read in as data. The viscosity of the insulating medium may be read in as an input parameter for the simulation. A simulation of the flow dynamics of the medium in the device and in the surroundings thereof can be determined and used to derive a degree of damping of the device. The simulation may be performed for example by means of various embodiments of the device as a simulation model, in order to determine an optimum configuration of the device for a specified high-voltage system.

All of the described and/or depicted features can be advantageously combined with one another within the scope of the invention. The invention is not restricted to the exemplary embodiments described.

The invention claimed is:

1. A high-voltage system comprising a device, the device including:
a piston and a housing for compensating for at least one of a vibration or a material stress of a component of the high-voltage system filled with a viscous medium;
said piston and said housing being movable in opposite directions along an axis;
said piston having a first end piece to be coupled to the component, and said piston having and a second end piece disposed at least partly within and enclosed by said housing;
said housing having an inner wall;
a spring coupling said second end piece of said piston to said inner wall of said housing; and
said piston and said housing configured to be disposed in the high-voltage system and surrounded by the medium filling the high-voltage system.

2. The high-voltage system according to claim 1, wherein said housing has an outer wall to be coupled to a supporting structure of the high-voltage system.

3. The high-voltage system according to claim 1, wherein at least one of said piston or said housing are configured in dependent on at least one of:
a property of the component of the high-voltage system, or
a property of the high-voltage system, or
surroundings of the high-voltage system, or
conditions of transport or mounting of the high-voltage system.

4. The high-voltage system according to claim 1, wherein the viscous medium is an insulating liquid.

5. The high-voltage system according to claim 1, wherein said housing has a plurality of inner walls, and said second end piece of said piston is spaced apart from at least one of said inner walls of said housing by a gap defining a specified minimum gap distance.

6. The high-voltage system according to claim 5, wherein said minimum gap distance is defined in dependence on specified production tolerances of at least one of the component of the high-voltage system or the high-voltage system.

7. The high-voltage system according to claim 1, wherein said housing has walls including said inner wall, and at least one of said walls of said housing has at least one passage for a flow of the medium into the housing or out of the housing.

8. The high-voltage system according to claim 1, wherein said second end piece of said piston has at least one clearance.

9. The high-voltage system according to claim 1, wherein said housing has a plurality of inner walls, and at least one of said inner walls of said housing has at least one clearance.

10. The high-voltage system according to claim 1, wherein:
said housing has walls including said inner wall and said inner wall is one of a plurality of inner walls;
at least one of said walls of said housing has at least one passage for a flow of the medium into the housing or out of the housing;
said second end piece of said piston has at least one clearance;
at least one of said inner walls of said housing has at least one clearance; and
at least one of a number or a configuration or a position of said at least one clearance or said at least one passage is formed in dependence on a specified property of at least one of:
the high-voltage system, or
surroundings of the high-voltage system, or
conditions of transport or mounting of the high-voltage system.

11. The high-voltage system according to claim 1, wherein said spring is at least one spring having a spring constant defined for compensating for at least one of a vibration or a material stress of the component in dependence on at least one of:
- a property of the component of the high-voltage system, or
- a property of the high-voltage system, or
- surroundings of the high-voltage system, or
- conditions of transport or mounting of the high-voltage system.

12. The high-voltage system according to claim 1, wherein said spring is at least one spring, and said at least one spring includes at least one of a helical spring, a cup spring, a buffer spring or an annular spring.

13. The high-voltage system according to claim 1, wherein said spring is at least one spring formed at least partly of glass-fiber reinforced plastic.

* * * * *